United States Patent
Svensson

(12) 
(10) Patent No.: US 6,439,588 B1
(45) Date of Patent: Aug. 27, 2002

(54) V-STAY MOUNTING FOR VEHICLES

(75) Inventor: Roland Svensson, Varobacka (SE)

(73) Assignee: Volvo Lastvagnar AB, Gothenburg (SE)

( * ) Notice: Subject to any disclaimer, the term of this patent is extended or adjusted under 35 U.S.C. 154(b) by 0 days.

(21) Appl. No.: 09/582,715

(22) PCT Filed: Dec. 22, 1998

(86) PCT No.: PCT/SE98/02431

§ 371 (c)(1),
(2), (4) Date: Sep. 25, 2000

(87) PCT Pub. No.: WO99/36279

PCT Pub. Date: Jul. 22, 1999

(30) Foreign Application Priority Data

Dec. 30, 1997 (SE) .............................................. 9704920

(51) Int. Cl.⁷ ................................................. B60G 9/02
(52) U.S. Cl. ................................. 280/124.116; 180/352; 180/360; 180/354; 280/86.75; 280/124.156; 248/225.11; 248/289.11
(58) Field of Search ................... 280/124.128, 124.153, 280/86.75, 124.107, 124.106, 124.116, 124.11, 124.156, 124.162; 180/352, 354, 360, 375, 378, 349; 248/225.11, 230.4, 289.11

(56) References Cited

U.S. PATENT DOCUMENTS

| | | | | |
|---|---|---|---|---|
| 4,225,104 A | * | 9/1980 | Larson | |
| 4,714,360 A | * | 12/1987 | Petros | |
| 5,649,719 A | | 7/1997 | Wallace et al. | |

FOREIGN PATENT DOCUMENTS

| | | |
|---|---|---|
| EP | 0 739 764 | 10/1996 |
| WO | WO 97/47484 | 12/1997 |

* cited by examiner

Primary Examiner—Peter C. English
Assistant Examiner—Ruth Ilan
(74) Attorney, Agent, or Firm—Young & Thompson

(57) ABSTRACT

Attachment bracket with attachment plate for fixing a V-shaped torque rod. The bracket (21) has a support plate (22) intended to be fixed on a frame member, and a bearing surface (23) which forms an angle of less than 90° with the support plate and against which an attachment plate (19) fixed to the torque rod is intended to be screwed securely. The bracket and the plate have slots (27, 28, 31) which are open to the sides and which receive screws (29, 30), that slot (27) of the bracket nearest the support plate being designed so that the screw can be pivoted between a mounting position parallel to the support plate and a position at right angles to the bearing surface.

10 Claims, 3 Drawing Sheets

V-STAY MOUNTING FOR VEHICLES

BACKGROUND OF THE INVENTION

The present invention relates generally to an attachment bracket with attachment plate, which each have at least two openings into which screws can be introduced for fixing the plate to the bracket. The invention relates in particular to an attachment for fixing a V-shaped torque rod to a vehicle frame.

V-shaped torque rods are used in vehicles with air suspension for stabilizing the wheel axles in the sideways and lengthwise directions. Each end of the rod has an attachment plate which is accommodated in a rubber bushing and is screwed securely to its attachment brackets which in turn are screwed securely in the lengthwise side frame members of the vehicle. The V-shaped rod is mounted as a unit, the attachment plates being screwed securely to the brackets with screws which are screwed into threaded bores in the brackets. Small tolerances are demanded here to ensure that dimensional deviations in angles and distances between the frame members do not result in its not being possible to make the bores in the plates at the same time coincide on both sides with the bores in the brackets.

SUMMARY OF THE INVENTION

The object of the present invention is to make available an attachment bracket and attachment plate which are intended particularly but not exclusively to connect a torque rod to a vehicle frame and an air-suspended wheel suspension in order to reduce the tolerance sensitivity and to facilitate assembly work.

According to the invention, this is achieved by the fact that at least the openings in the plate are slots which are open to the sides and into which the screws can be introduced from the side, that the bracket has a bearing surface against the plate, which surface forms an angle of less than 90° with a support surface of the bracket, and that at least that opening of the bracket nearest the support surface is designed in such a way that the screw in it can be pivoted between a position at least essentially parallel to the support surface and a position at right angles to the bearing surface.

When using the attachment bracket and the attachment plate for connecting a torque rod to a vehicle frame and a wheel suspension, the attachment brackets are screwed or riveted with their support surfaces against lengthwise frame members and the attachment plates are fixed to the ends of the rod.

With one screw of each bracket angled so that it lies parallel to the frame member, the rod can be introduced, without obstruction by the screws, horizontally and parallel to the frame members until the plates are bearing against the bearing surfaces of the attachment brackets, after which the screw is angled upwards and nuts are screwed on both screws in order to fix the plate to the bracket. The solution according to the invention makes assembly simple. This permits automated assembly and the use of simple standard components.

BRIEF DESCRIPTION OF THE DRAWINGS

The invention is described in greater detail with reference to illustrative embodiments shown on the attached drawings, where.

DESCRIPTION OF THE PREFERRED EMBODIMENTS

Figure 1:
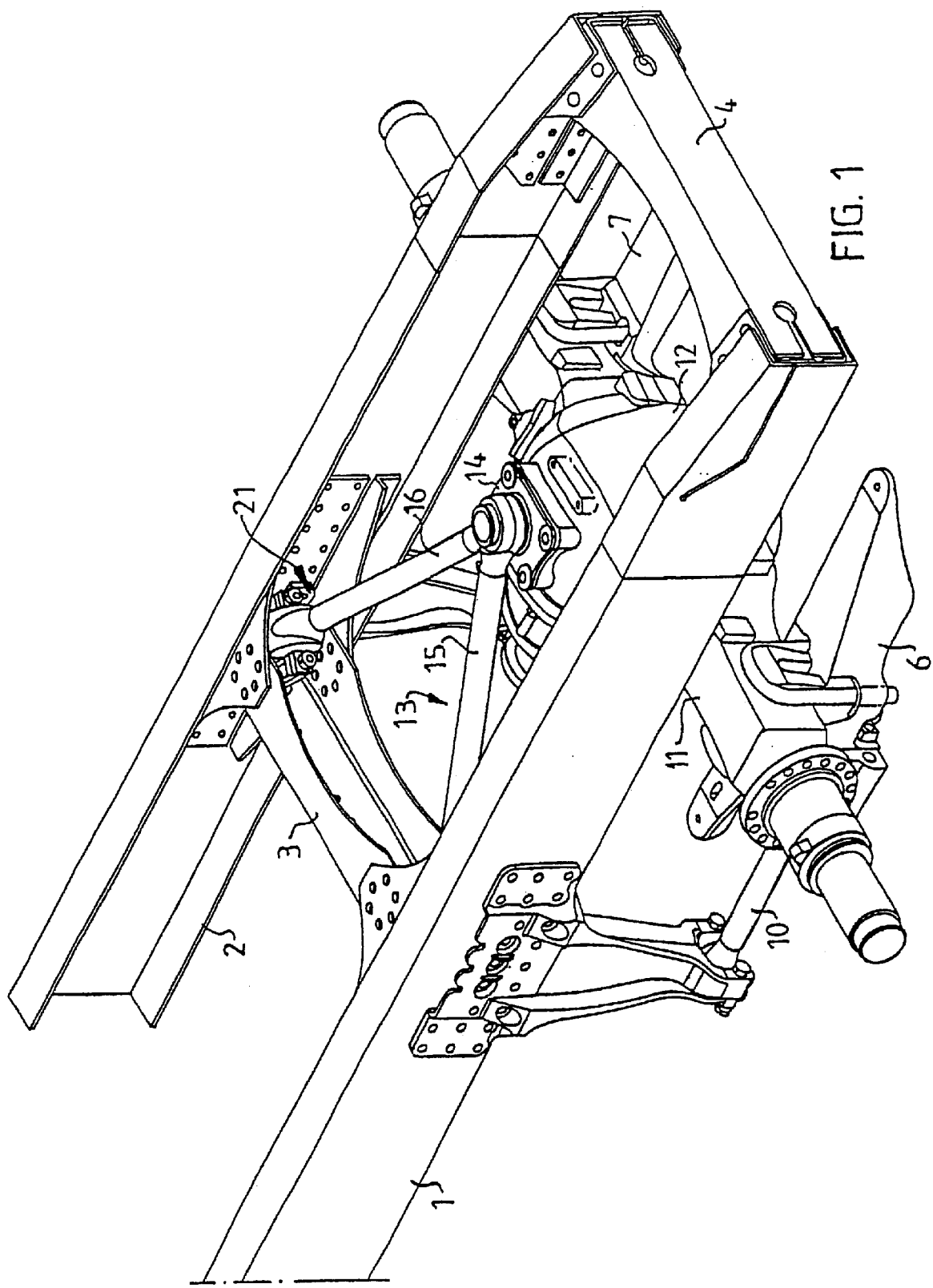
FIG. 1 shows a rear part of a heavy vehicle frame with wheel suspension.
Figure 2:
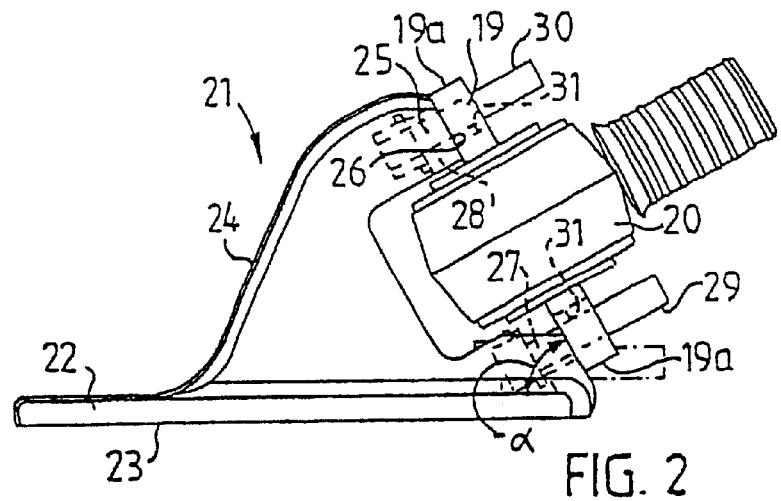
FIG. 2 shows a partially cut away side view.

In FIG. 1, reference numbers 1 and 2 designate the rear parts of left and right longitudinal frame members, respectively, in a vehicle with air suspension. The frame members 1 and 2 are connected to each other via cross members 3 and 4 and bear a rear axle suspension of a rear axle 11. The rear axle suspension comprises a pair of support arms 6 and 7 for the rear axle. The frame members 1 and 2 rest via spring elements (not shown) on the support arms 6, 7 which are connected to the frame members 1 and 2 via lengthwise torque rods 10 and stabilizers and shock absorbers (not shown). In addition, the frame members 1 and 2 are connected to the rear axle 11 via a V-shaped torque rod 13. The plate 14 on the torque rod 13 is screwed securely to a differential housing 12 of the rear axle 11.

Figure 3:
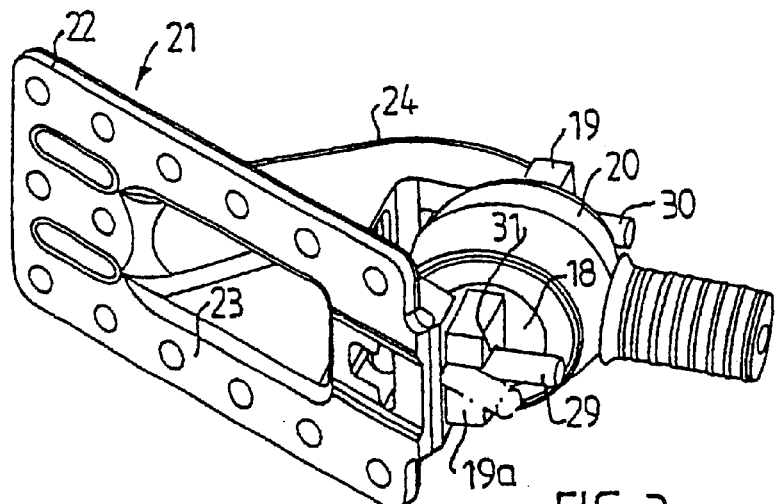
FIG. 3 shows a perspective view.
Figure 4:
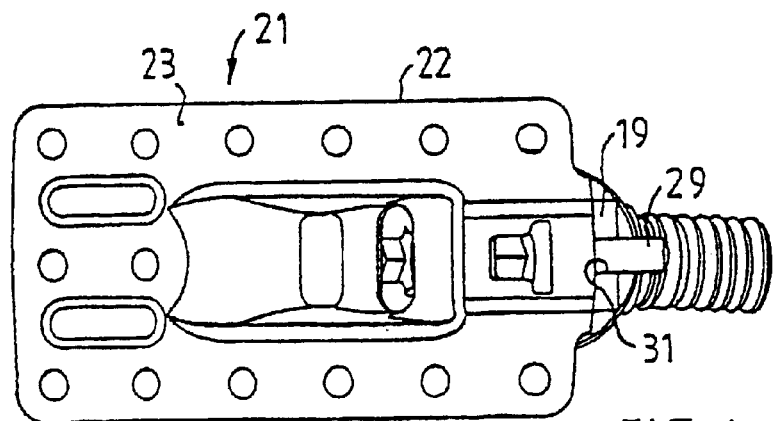
FIG. 4 shows a plan view from underneath in an embodiment of an attachment bracket and attachment plate according to the invention.
Figure 5:
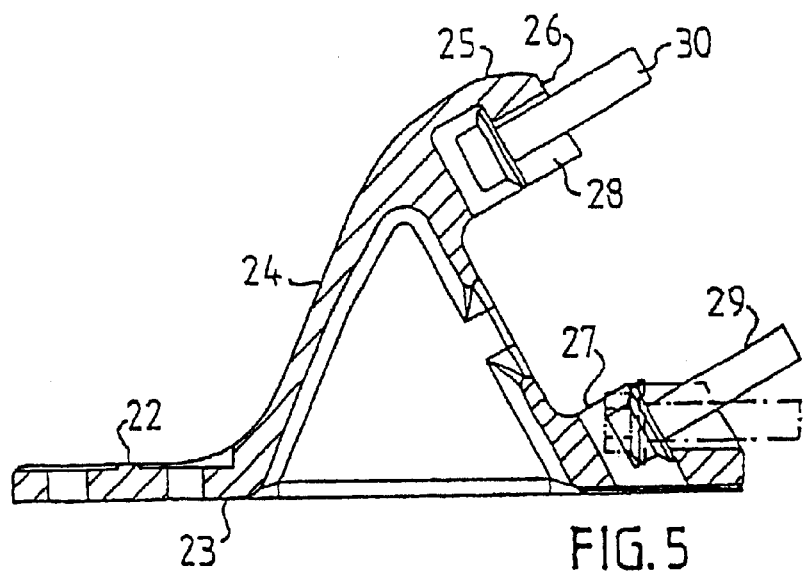
FIG. 5 shows a longitudinal section through the attachment bracket.

The two branches 15, 16 of the torque rod 13 are provided at their ends with articulations which comprise a cylindrical rubber bushing 18 (FIG. 3) in which a rectangular metal plate 19 is cast. The bushing 18 is vulcanized in a sleeve 20. Each plate 19 is securely screwed onto a bracket 21 which in turn is securely screwed or riveted on each frame member 1 and 2, respectively.

The attachment bracket 21, which is shown in greater detail in FIGS. 2–5, comprises a support plate 22 with a support surface 23 and is securely riveted to the respective frame member 1, 2. Projecting upwards from the support plate 22 is a flange portion 24 which has a wall portion 25 with a bearing surface 26 for the attachment plate. The bearing surface 26 forms an angle α with the support surface 23, which is smaller than 90° and which depends on the angle between the two branches of the rod 13. The flange portion 24 of the bracket 21 is U-shaped and engages over the sleeve 20 with the plate 19. The wall portion 25 is designed with slots 27 and 28 which are open inwardly towards the sleeve 20 and receive screws 29 and 30 which project into slots 31 in the plate 19. The slots 31 are open outwardly towards the side edges 19a of the plate, which means that when the plate 19 is bearing against the surface 26 of the bracket 21, the screws 29, 30 are limited in their sideways movement. The slot 31 nearest the support plate 22 is designed in such a way that the screw 29 can be pivoted between the position shown by broken lines and the position shown by full lines in FIGS. 2 and 3.

With the screws 29 in the position shown by broken lines, which is parallel to the frame members 1, 2, the torque rod 13 can be pushed into place between the frame members 1, 2 without obstruction by the screws 29. By using slots instead of threaded holes in the bracket 19, tolerance deviations can be balanced out, which facilitates assembly and reduces the amount of products rejected. When the attachment plates 19 are bearing against the bearing surfaces 26 of the brackets, the screws 29 are pivoted upwards to the position shown by full lines, after which nuts (not shown) are screwed on and tightened. The whole of the described assembly procedure can be automated, resulting in low assembly costs.

Figure 6:
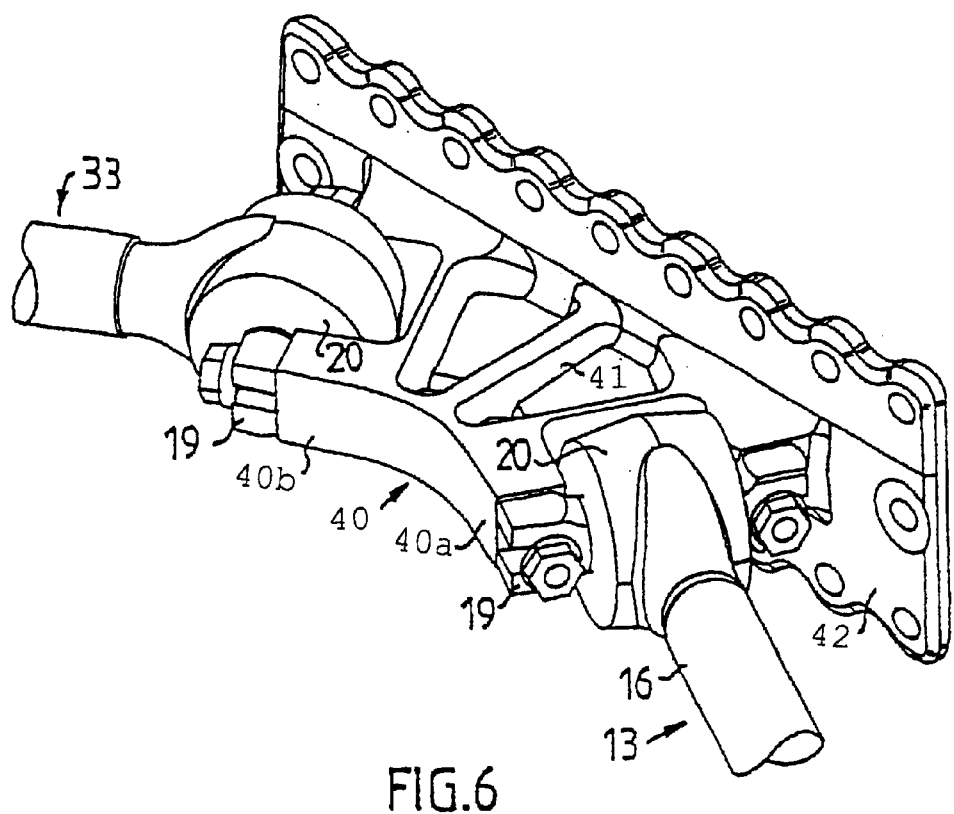
FIG. 6 shows a perspective view of a double attachment bracket.

FIG. 6 shows a double attachment bracket 40 which consists of a bracket half 40a corresponding to the bracket 21 and a bracket half 40b which is the mirror image of, but otherwise identical to, the bracket half 40a. The two bracket halves 40a, 40b are designed to form one piece with each other via an intermediate support portion 41. The bracket halves 40a, 40b have a common support plate 42.

A double attachment bracket 40 is used as an alternative to two single brackets 21 in a vehicle with a further wheel axle (not shown) in front of the member 3, which axle has a V-shaped rod 33 corresponding to the rod 13, but mirror-inverted.

What is claimed is:

1. Attachment bracket with attachment plate, which each have at least two openings into which screws can be introduced for fixing the plate to the bracket, characterized in that at least the openings (31) in the plate (19) are slots which are open to sides of the plate and into which the screws (29, 30) can be introduced from the side, in that the bracket (21) has a bearing surface (26) against the plate (19), which surface forms an angle ($\alpha$) of less than 90° with a support surface (23) of the bracket, and in that at least that opening (27) of the bracket nearest the support surface is designed so that the screw (29) can pivot in it between a position at least essentially parallel to the support surface and a position at right angles to the bearing surface.

2. Attachment bracket with attachment plate according to claim 1, characterized in that the attachment bracket (21) is fixed with its support surface (23) against a frame member (1 or 2) of a vehicle and in that the attachment plate (19) is fixed to one end of a torque rod (13) which has members (14) arranged to be connected to a wheel suspension mounted in the frame member.

3. Attachment bracket with attachment plate according to claim 1, characterized in that the attachment plate (19) is rectangular and accommodated in a bushing (18) made of elastic material and in that the slots (31) are formed in end portions which project from the bushing.

4. Attachment bracket with attachment plate according to claim 1, characterized in that the pivotable screw (29) in its position at right angles to the bearing surface (26) bears with its screw head against a surface, surrounding the slot, on the opposite side of the bearing surface.

5. Attachment bracket with attachment plate according to claim 1, characterized in that the openings (27, 28) in the bracket (21) are slots.

6. Attachment bracket with attachment plate according to claim 5, characterized in that the slots (31) in the attachment plate (19) are directed counter to the slots (27, 28) in the attachment bracket (21) so that the slots together delimit the freedom of movement of the screws (29, 30) in the sideways direction.

7. Attachment bracket with attachment plate according to claim 2, characterized in that the attachment plate (19) is rectangular and accommodated in a bushing (18) made of elastic material and in that the slots (31) are formed in end portions which project from the bushing.

8. Attachment bracket with attachment plate according to claim 7, characterized in that the pivotable screw (29) in its position at right angles to the bearing surface (26) bears with its screw head against a surface, surrounding the slot, on the opposite side of the bearing surface.

9. Attachment bracket with attachment plate according to claim 8, characterized in that the openings (27, 28) in the bracket (21) are slots.

10. Attachment bracket with attachment plate according to claim 9, characterized in that the slots (31) in the attachment plate (19) are directed counter to the slots (27, 28) in the attachment bracket (21) so that the slots together delimit the freedom of movement of the screws (29, 30) in the sideways direction.

* * * * *